(12) United States Patent
Feraud

(10) Patent No.: US 10,582,083 B2
(45) Date of Patent: Mar. 3, 2020

(54) METHOD OF SECURELY TRANSMITTING AN IMAGE FROM AN ELECTRONIC IDENTITY DOCUMENT TO A TERMINAL

(71) Applicant: IDEMIA FRANCE, Colombes (FR)

(72) Inventor: Alban Feraud, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 14/549,866

(22) Filed: Nov. 21, 2014

(65) Prior Publication Data
US 2016/0072979 A1 Mar. 10, 2016

(30) Foreign Application Priority Data
Nov. 22, 2013 (FR) ..................................... 13 61512

(51) Int. Cl.
| | | |
|---|---|---|
| H04N 1/32 | (2006.01) | |
| G06F 21/60 | (2013.01) | |
| G06T 1/00 | (2006.01) | |
| H04N 1/00 | (2006.01) | |
| G07C 9/00 | (2020.01) | |

(52) U.S. Cl.
CPC ....... *H04N 1/32149* (2013.01); *G06F 21/606* (2013.01); *G06T 1/0021* (2013.01); *G07C 9/00079* (2013.01); *H04N 1/00209* (2013.01); *H04N 1/32352* (2013.01); *G07C 2209/41* (2013.01)

(58) Field of Classification Search
None
See application file for complete search history.

(56) References Cited

U.S. PATENT DOCUMENTS

| 7,207,480 | B1* | 4/2007 | Geddes | G06Q 20/32 235/379 |
|---|---|---|---|---|
| 2002/0051577 | A1* | 5/2002 | Kinjo | G06T 1/0028 382/218 |
| 2004/0039741 | A1* | 2/2004 | Benson | G06F 21/10 |
| 2008/0313082 | A1* | 12/2008 | Van Bosch | G06Q 20/02 705/50 |
| 2010/0052852 | A1* | 3/2010 | Mohanty | B42D 25/00 340/5.83 |

(Continued)

OTHER PUBLICATIONS

Hyppönen, Konstantin, Marko Hassinen, and Elena Trichina. "Pseudonymous Mobile Identity Architecture Based on Government-Supported PKI." Trusted Computing-Challenges and Applications. Springer Berlin Heidelberg, 2008. 107-118.*

(Continued)

*Primary Examiner* — Vu Le
*Assistant Examiner* — Tracy Mangialaschi
(74) *Attorney, Agent, or Firm* — MH2 Technology Law Group, LLP

(57) ABSTRACT

The invention relates to systems and methods of securely transmitting an image stored in the memory of an identity document to a first terminal that is suitable for receiving the image. In various implementations, operations are performed by the identity document, including
the identity document receiving an attribute transmitted by the first terminal;
generating a marker from the attribute received from the terminal;
including the marker in the image; and
transmitting the image containing the marker, which may be referred to as the "modified" image, to the terminal.

23 Claims, 4 Drawing Sheets

(56) References Cited

U.S. PATENT DOCUMENTS

| | | | |
|---|---|---|---|
| 2011/0088090 A1* | 4/2011 | O'Brien | G06F 21/10 |
| | | | 726/19 |
| 2012/0090038 A1* | 4/2012 | Pacella | G06Q 20/32 |
| | | | 726/30 |
| 2013/0239230 A1* | 9/2013 | Herbach | G06F 21/6227 |
| | | | 726/28 |

OTHER PUBLICATIONS

Hyppönen, Konstantin, Marko Hassinen, and Elena Trichina. "Transforming Mobile Platform with PKI-SIM Card into an Open Mobile Identity Tool." ISSE 2008 Securing Electronic Business Processes. Vieweg+ Teubner, 2009. 208-217.*

Lin, Ching-Yung, and Shih-Fu Chang. "Semifragile watermarking for authenticating JPEG visual content." Security and Watermarking of Multimedia Contents II. vol. 3971. International Society for Optics and Photonics, 2000.*

Search Report dated Aug. 6, 2014 from French Application No. 1361512, filed on Nov. 22, 2013, pp. 1-2.

Hypponen, Konstantin et al. Pseudonymous Mobile Identity Architecture Based on Government-Supported PKI. Lecture Notes in Computer Science/Computational Science, Mar. 1, 2008, vol. 4968, pp. 107-118. XP002544369.

Hypponen, Konstantin et al. Combining Biometric Authentication with Privacy-Enhancing Technologies. Lecture Notes in Computer Science/Computation Science, Mar. 1, 2008, vol. 4968, pp. 155-165. XP002544370.

* cited by examiner

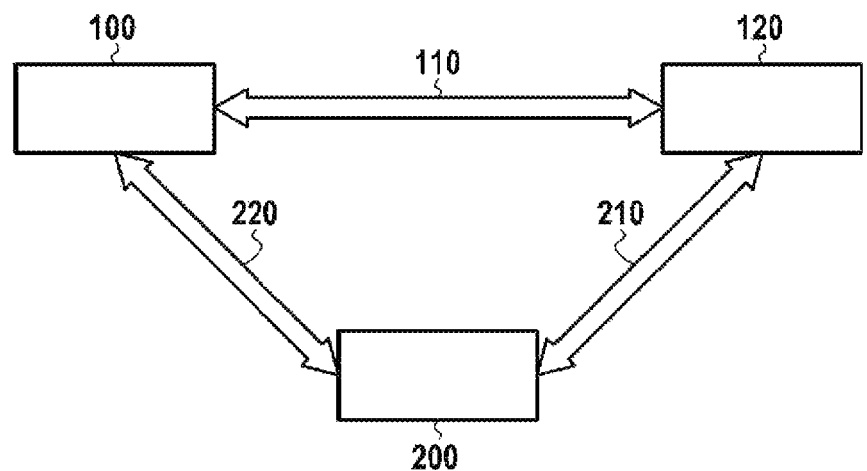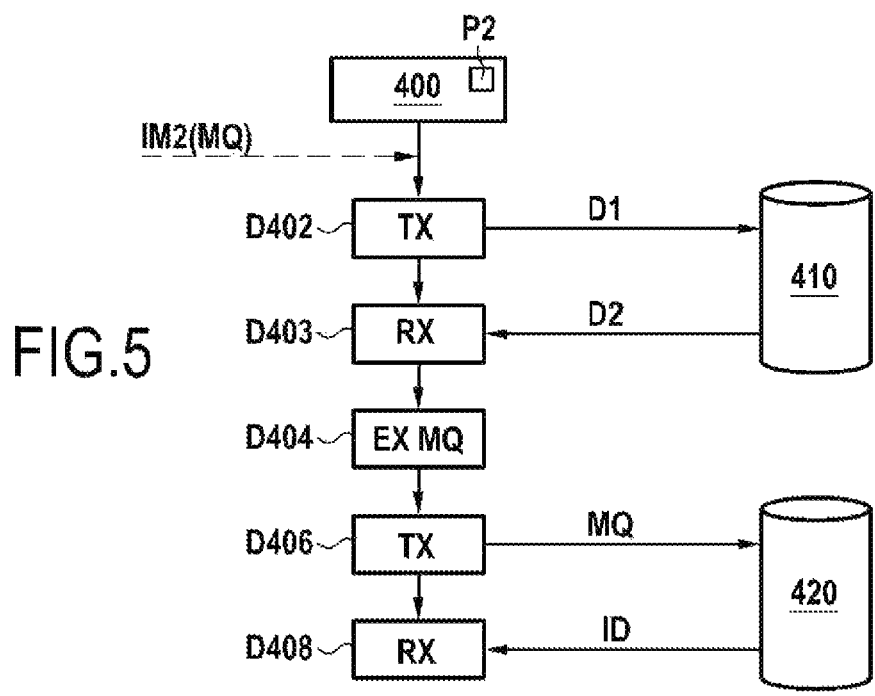

METHOD OF SECURELY TRANSMITTING AN IMAGE FROM AN ELECTRONIC IDENTITY DOCUMENT TO A TERMINAL

CROSS-REFERENCE TO RELATED APPLICATIONS

This application claims priority to French Application No. 1361512, filed on Nov. 22, 2013, the entire disclosure of which is hereby incorporated by reference in its entirety.

BACKGROUND OF THE INVENTION

The present invention relates to the field of secure transmission of data from an electronic identity document to a terminal, and it relates more particularly to identifying such a terminal that has retransmitted such data in non-authorized manner.

The invention relates in particular, but in non-exclusive manner, to transmitting digital images stored, in an electronic identity document of the type, comprising an electronic passport, an electronic drivers license, a health card, or indeed an electronic signature card, for example.

In known manner, an electronic identity document, such as an electronic passport for example, may contain digital images that can be transmitted to a terminal suitable for processing such images. For example, during an identity check, the electronic identity document may transmit such a digital image to a first terminal in response to a request from the first terminal. In general, the digital image is transmitted to the terminal with the authorization of the proprietor of the electronic identity document. Nevertheless, once a digital image has been transmitted to said first terminal, the proprietor of the electronic identity document generally has no control over any subsequent use that the first terminal might make of the image. In particular, the proprietor of the electronic identity document cannot prevent the first terminal from subsequently distributing the digital image to non-authorized destinations. This lack of control thus poses a security problem relating to the digital image in question.

Under certain circumstances, the proprietor need not be the same as the physical bearer. Under such circumstances, the term "proprietor" may advantageously be replaced by the term "bearer", it being understood that the bearer in question is the bearer of the electronic document, a usage that is frequent in specialized documentation.

By way of example, with electronic passports, it is important to be able to verify whether a digital image transmitted during an identity check is subsequently transmitted without authorization by the first terminal to some other terminal. This requirement for verification is particularly critical with digital images that constitute confidential information such as an identity photograph, or a biometric image (e.g. an image of a fingerprint or an image of an iris).

By way of information, the scientific article: "2008 The Institution of Engineering and Technology Pseudonymous mobile identity architecture based on government-supported PKI" by K. Hypponen et al. (lecture notes in computer science/computational science CHES 2008, Springer D E, vol. 4968 Mar. 1, 2008, pp 107-118, XP002544369) describes a conventional encryption/decryption method in which an encrypted image is transmitted from a first terminal to a second terminal, the method not making it possible to verify whether the digital image is distributed by the second terminal.

There therefore exists a need for a solution that makes it possible to be able to check effectively on any distribution that might be made by a terminal of an image provided by an electronic identity document (e.g. of the electronic passport or electronic drivers license type).

OBJECT AND SUMMARY OF THE INVENTION

To this end, the present invention provides a transmission method for securely transmitting an image stored in the memory of an identity document to a first terminal suitable for receiving the image, the method being performed by the identity document and being characterized in that it comprises:

the identity document receiving an attribute transmitted by the first terminal;
generating a marker from the attribute;
including the marker in the image; and
transmitting the image containing the marker, referred to as the "modified" image, to the first terminal.

In an implementation, the attribute comprises authentication data verified by the identity document.

In an implementation, the attribute is at least one of the following: a date; a location of the first terminal; an identifier of the first terminal; an identifier of the operator of the first terminal; or any other attribute characterizing an exchange.

The invention is advantageous in that the modified image transmitted to the first terminal includes a marker having information about the first terminal, about the operator of the first terminal, or about the transaction between the first terminal and the identity document that led to the modified image being transmitted to the first terminal. The invention thus makes it possible to discourage non-authorized distribution of the image once the image has been transmitted to the first terminal, in so far as such information makes it possible to identify and thus find the first terminal or the operator of the first terminal or to characterize the transaction that led to the image being transmitted, and as a result to engage the offender's responsibility.

In a particular implementation, the inclusion of the marker modifies the visual appearance of the image.

In a particular implementation, the inclusion of the marker in the image is invisible to the naked eye.

In a particular implementation, while it is being generated, the confidentiality of the marker is protected by encryption.

In a particular implementation, while it is being generated, the integrity and/or the authenticity of the marker is/are protected by the first terminal signing the attribute.

In a particular embodiment, the identity document is an electronic passport. Furthermore, said attribute received by the identity document is transmitted by the first terminal in compliance with the extended access control (EAC) protocol as specified in the "TR 03110 v1.11" directives.

By way of example, the transmission method in accordance with the EAC protocol includes a step of mutual authentication between the identity document and the first terminal, with said attribute being transmitted by the first terminal to the identity document only after mutual authentication has been successfully achieved.

In a particular implementation, the various steps of the transmission method are determined by computer program instructions.

Consequently, the invention also provides a computer program on a data medium (or a recording medium), the program being suitable for being performed in an identity document, or more generally in a computer, the program including instructions suitable for performing steps of a transmission method as identified above.

The program may use any programming language, and it may be in the form of source code, object code, or code intermediate between source code and object code, such as in a partially compiled form, or in any other desirable form.

The invention also provides a data medium (or a recording medium) that is readable by an identity document, or more generally by a computer, and that includes instructions of a computer program as specified above.

The data medium may be any entity or device capable of storing the program. For example, the medium may comprise storage means, such as a nonvolatile rewritable memory (of the EEPROM or Flash NAND type, for example), or such as a read-only memory (ROM), for example a compact disk (CD) ROM, or a microelectronic circuit ROM, or indeed magnetic recording means, e.g. a floppy disk or a hard disk.

Furthermore, the data medium may be a transmissible medium such as an electrical or optical signal that can be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides a method of determining an attribute from a marker incorporated in an image by the above method, the image being received by a second terminal, the method being performed by the second terminal and comprising:
  extracting a marker contained in the image.
  In an implementation, the method further comprises:
  sending the marker to a first database; and
  in response to sending said marker, recovering the attribute from the first database.

In a particular implementation, prior to the extraction step, the method comprises sending to a second database first data obtained from the received image, and receiving second data in response to sending the first data, with the extraction being performed on the basis of the second data.

In advantageous manner, if the modified digital image is transmitted by the first terminal to some other terminal, it is then possible to identify the first terminal, or the operator of the first terminal, or indeed to characterize the transaction that led to the modified digital image being transmitted, on the basis of the marker included in said modified digital image.

More particularly, in the event of such transmission of the modified digital image to the other terminal not being authorized, the marker makes it possible to determine the identity of the first terminal, or of its operator, or indeed to characterize the transaction that led to the modified digital image being transmitted, and thus to call into question the responsibility of the offender.

Correspondingly, the invention provides an identity document suitable for performing a method of securely transmitting an image stored in the memory of the identity document to a first terminal suitable for receiving the image, the identity document comprising:
  means for receiving an attribute transmitted by the first terminal;
  means for generating a marker from the attribute;
  means for including the marker in the image; and
  means for transmitting the image containing the marker, referred, to as the "modified" image, to the terminal.

The invention also provides a terminal, referred to as a "second" terminal, suitable for performing a method of determining an attribute as defined above, the second terminal including:
  means for extracting a marker contained in the image.
  In a particular embodiment, the terminal further includes:
  means for sending the marker to a first database; and
  means for recovering, in response to sending said marker, the attribute from the first database.

In a particular embodiment, the terminal further includes means for sending to a second database first data obtained from the received image and means for receiving second data in response to sending the first data, with the extraction being performed on the basis of the second data.

Furthermore, the invention provides a system comprising an identity document as defined above, the identity document being suitable for performing a transmission method as defined above, and a terminal as defined above, the terminal being suitable for performing a method of determining an attribute as defined above.

BRIEF DESCRIPTION OF THE DRAWINGS

Other characteristics and advantages of the present invention appear from the following description made with reference to the accompanying drawings, which show an implementation having no limiting character. In the figures:

FIG. 3 is a diagram showing an electronic identity document, a first terminal, and a trusted third party co-operating together in accordance with a second implementation of the invention;

FIG. 5 is a flowchart showing the main steps of a method of determining an attribute in accordance with a particular implementation of the invention.

DETAILED DESCRIPTION OF IMPLEMENTATIONS

The present invention relates to the field of secure transmission of data from an electronic device to a terminal, and it relates more particularly to identifying such a terminal, to identifying an operator of the terminal, or to categorizing a transaction that has led to a digital image being transmitted between the electronic identity document and the terminal, in the event of the terminal forwarding such data in non-authorized manner.

In one example, the marker MQ is a digital tattoo. A digital tattoo is a mark or a message included in digital data enabling information to be added to said digital data.

Figure 1:
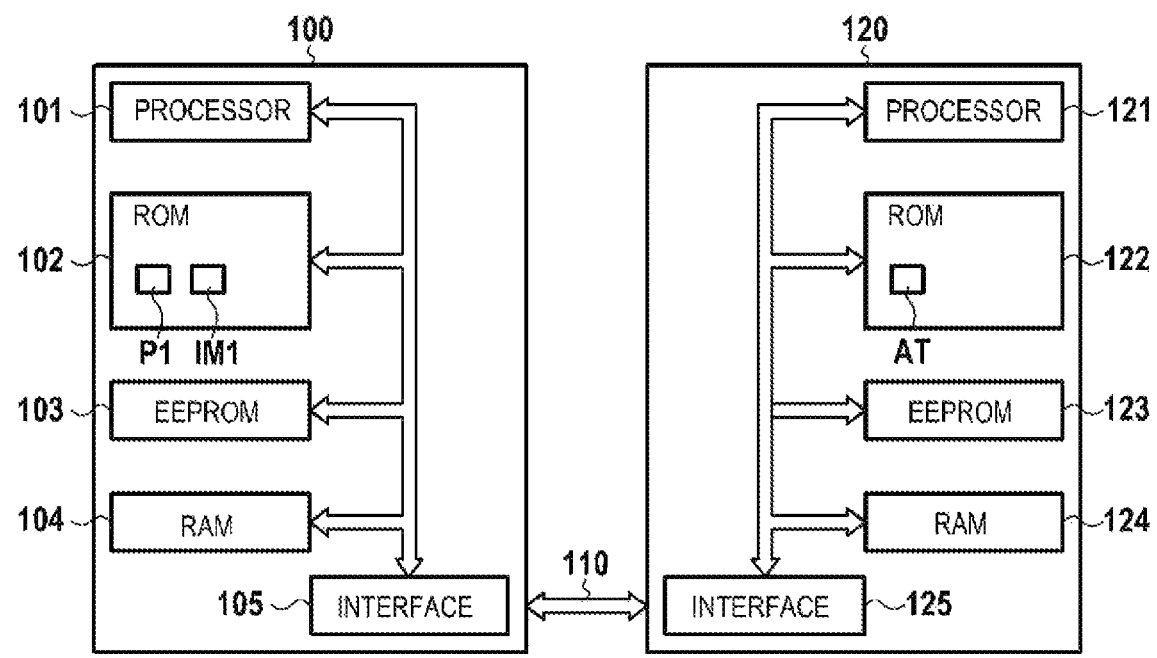
FIG. 1 is a diagram showing the hardware architectures of an electronic identity document and of a first terminal in accordance with a first implementation of the invention.

FIG. 1 is a diagram showing a first implementation with an electronic identity document 100 configured to be capable of cooperating via a first communication link 110 with a first terminal 120. This first communications link 110 may be a link with contact or it may be a wireless link, depending on circumstances.

By way of example, the electronic identity document 100 is of the electronic passport type or of the electronic drivers license type. Nevertheless, it can be understood that the invention applies more generally to an electronic device capable of transmitting an image stored in a memory of the electronic device.

The electronic identity document 100 presents the conventional architecture of a computer. Said electronic identity document 100 comprises in particular a microprocessor 101, a ROM 102, a nonvolatile rewritable memory 103 (e.g. of the EEPROM type or of the Flash NAND type), a volatile rewritable memory 104 (also known as random access memory (RAM)); and an input and output interface 105.

In this example, the ROM 102 constitutes a data (or recording) medium in accordance with a particular embodiment of the invention. The ROM 102 stores a computer program P1 enabling the electronic identity document 100 to perform a transmission method in accordance with a particular implementation of the invention (cf. FIGS. 2 and 4). Furthermore, a digital image IM1 is stored in the ROM 102. In a variant, the computer program P1 is stored in the nonvolatile rewritable memory 103, and the digital image IM1 is stored in the nonvolatile rewritable memory 103, or in the volatile rewritable memory 104. In the present example, where the electronic identity document 100 is an electronic passport for example, the digital image IM1 may be biometric data such as an image of a fingerprint or an image of the iris of an eyeball.

The first terminal 120 also has the conventional architecture of a computer. In particular, the first terminal 120 comprises a microprocessor 121, a ROM 122, a nonvolatile rewritable memory 123 (of the EEPROM or of the Flash NAND type, for example), a volatile rewritable memory 124 (of the RAM type), and an input and output interface 125, which interface is adapted to cooperate with the input and output interface 105 of the electronic device 100 in order to enable signals to be exchanged between the first terminal 120 and said electronic device 100.

The ROM 122 of the first terminal 100 in this example includes an attribute AT of the first terminal 120. In a variant, the attribute AT is stored in the nonvolatile rewritable memory 123, or indeed outside the first terminal 120 (external entity). By way of example, this attribute AT is an identifier of said first terminal 120, an identifier of the operator of the first terminal 120, a location of said first terminal 120, the date of the day, or any other attribute characterizing the transaction that has led to a digital image being transmitted between the electronic identity document 100 and the first terminal 120. In another example, the attribute AT comprises a plurality of the above-mentioned elements. In an example, the identifier of the first terminal 120 is a name of said first terminal 120 or a serial number (e.g. the message authentication code (MAC) address of the first terminal 120). In an example, the identifier of the operator of the first terminal 120 is the identity of the operator (e.g. the operator's name), or the operator's accreditation. By way of example, the attribute characterizing the transaction is the security level applied during the transaction.

Figure 2:
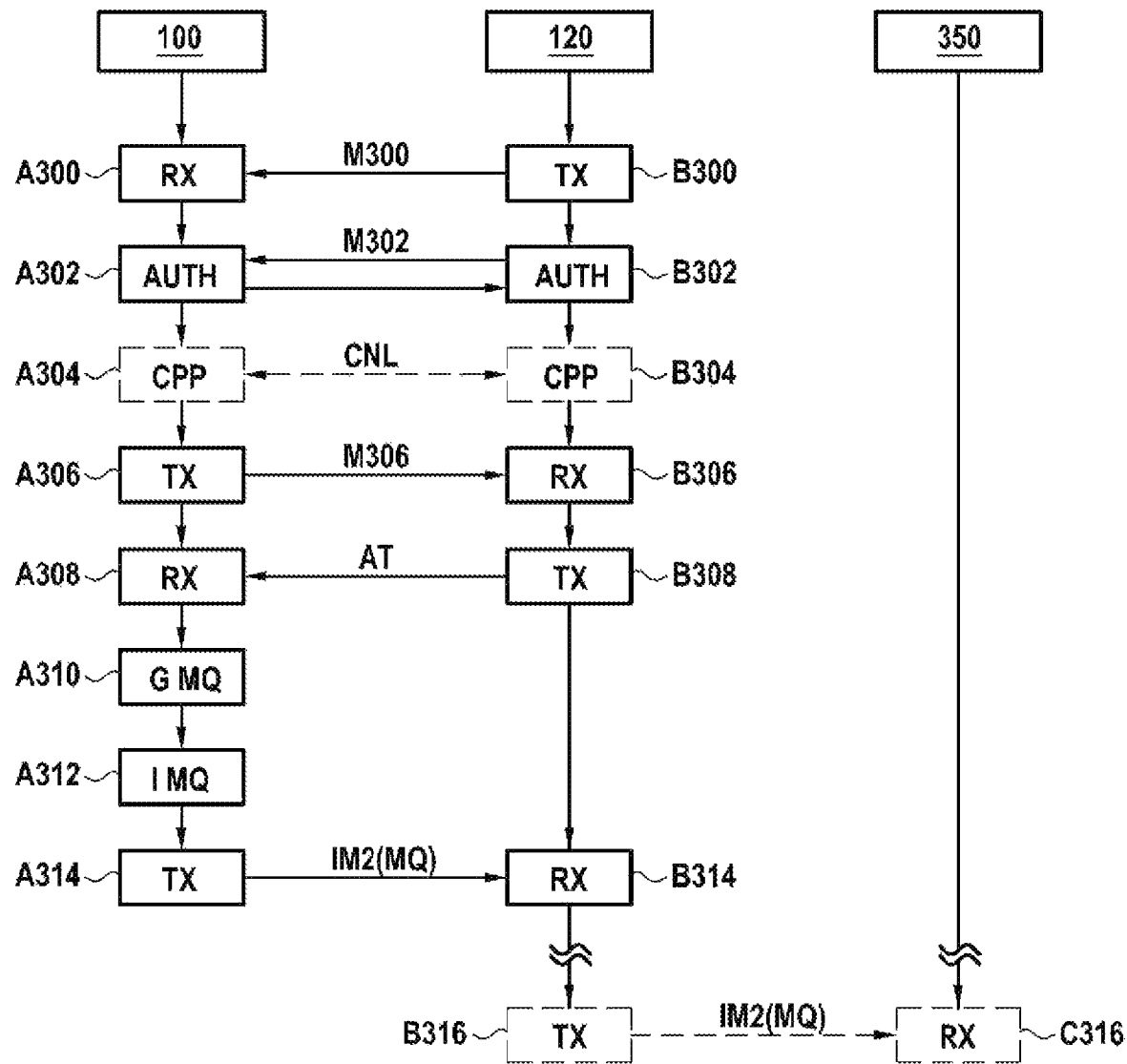
FIG. 2 is in the form of a flowchart and shows the main steps of a secure transmission method in accordance with the implementation of FIG. 1.

Still in the first implementation, FIG. 2 shows a transmission method performed by the electronic identity document 100 executing the program P1.

By way of example, consideration is given to the particular situation in which an electronic passport is being checked by a customs official while checking an identity by using the first terminal 120.

In a step B300, the first terminal 120 sends a request M300 to read the digital image IM1 stored in the electronic identity document 100. This request is sent B300, e.g. when the electronic passport is presented in the proximity of the interface 125 of the first terminal 120 (when the first communication link 110 is a wireless link).

This step B300 is followed by an authentication step A302, B302 performed collectively both by the electronic identity document 100 and by the terminal 120. During this step A302, B302, the first terminal 120 sends at least one data message (message M302) enabling the electronic identity document 100 to authenticate the first terminal 120.

If the first terminal 120 is authenticated successfully by the electronic identity document 100, then a secure communication channel CNL is created (A304, B304) between the electronic document 100 and the first terminal 120. This secure communication channel CNL provides data exchange with confidentiality and/or integrity and/or authenticity. In this example below, the electronic identity document 100 and the first terminal 120 communicate with each other in secure manner via the communication channel CNL.

Following the step A304, the electronic device 100 sends (A306), to the first terminal 120, a request M306 to read the attribute AT of the first terminal 120.

On receiving such a request, the first terminal 120 sends (B308) the attribute AT to the identity document 100. Alternatively, the first terminal 120 sends the attribute AT spontaneously (B308) without any prior request M306 coming from the identity document 100. Communication by means of the secure communication channel CNL enables the electronic document 100 to ensure that the attribute AT of the first terminal 120 is authentic, for example. Specifically, since the channel is secure, no external system can communicate with the electronic identity document 100, thus making it possible to guarantee that the attribute AT is associated with the first terminal 120 and thus making it possible to verify the identity of the first terminal 120.

In a variant, the step A304., B304 of creating the secure communication channel CNL is not performed. Under such circumstances, the electronic identity document 100 receives the attribute AT relating to the first terminal 120 from a third entity, in such a manner as to ensure at least the integrity and the authenticity of said attribute AT. In an implementation, the attribute AT is received via an electronic certificate that is certified (or sent) by an entity known to the electronic identity document 100.

In a variant, the steps A304, B304, A306, B306 and A308, B308 are not performed, and the attribute AT is sent by the first terminal 120 during the authentication step B302, in a manner that guarantees its integrity and its authenticity.

In an implementation, the steps A302, B302 and A304, B304 are not performed and the attribute as sent by the first terminal 120 includes authentication data verified by the electronic identity document 100 in order to authorize transmission of the image between the electronic identity document 100 and the first terminal 120. This authentication data is sent by a third entity and/or by the first terminal 120. In an example, the authentication data is a certificate, i.e. a cryptographic element guaranteeing the authenticity and the integrity of the attribute AT (e.g. a MAC or a digital signature), and thus guaranteeing its origin and that it has not been modified.

After the electronic identity document 100 has received the attribute AT, it generates (A310) a marker MQ on the basis of the attribute AT.

In one example, the marker MQ is a digital tattoo. A digital tattoo is a mark or a message included in digital data enabling information to be added to said digital data.

In an example, the information contained in the marker MQ is the attribute AT. Alternatively, the marker MQ may contain a portion of the attribute AT. In yet another example, the electronic identity document 100 generates (A310) the marker MQ by performing a calculation on the basis of the attribute AT. By way of example, the marker MQ may be the attribute AT in encrypted form.

In an example, during generation A310 of the marker MQ, the confidentiality of the marker MQ is protected by encryption. By way of example, the encryption algorithm is a block symmetrical encryption algorithm (of the "data encryption standard" type) making use of the feedback encryption mode of operation known as "cipher block chaining".

In another example, during generation A310 of the marker MQ, the integrity of the marker MQ is protected and optionally authenticated by the first terminal 120 signing the attribute AT.

In another example, during generation A310 of the marker MQ, the integrity of the marker MQ is protected by adding an error-correcting code to the attribute AT of the first terminal 120.

In another example, during generation A310 of the marker MQ, the confidentiality of said marker MQ is protected by encryption and its integrity and its authenticity are protected by the fact that the attribute AT is signed by the first terminal 120.

Thereafter, in a step A312, said electronic identity document 100 includes the marker MQ in the digital image IM1 stored in the memory 102. The marker MQ is preferably included in a copy of the digital image IM1 in order to conserve the original digital image IM1 in memory. Under such circumstances, the copy of the digital image IM1 containing the marker MQ may also be stored temporarily in the memory 103 or 104.

In an example, the marker MQ is a marker that can be seen visually by a third party, and it is destructive in the sense that including the marker in the digital image IM1 permanently changes the visual appearance of the digital image IM1. In another example, the marker MQ is invisible to the naked eye, in the sense that the marker MQ does not modify the visual appearance of the digital image IM1. Under such circumstances, the data of the digital image IM1 contains the marker MQ, without the marker MQ being visually perceptible for a person (or a machine) checking the digital image IM1.

In this example, the marker MQ is included in the digital image IM1 in imperceptible manner by steganographic coding. By way of example, the marker MQ is hidden in the values of the low-weight bits encoding the pixels of the digital image IM1, or in the format of the digital image IM1, using lossy compression.

In an example, after including the marker MQ, the digital image conserves a digital image format.

In an example, after including the marker MQ, the digital image conserves the same digital image format.

The format of the digital image may be a standard format (e.g. JPEG, GIF, PNG, or TIFF).

In an example, including the marker is irreversible, in the sense that this inclusion modifies the image in irreversible manner (e.g. lossy compression).

In an example, including the marker MQ in the digital image IM1 modifies the value of at least one pixel. This modification to the value of at least one pixel may be visible or invisible to the human eye.

The term "visible to the human eye" is used in this document to mean visible without having recourse to an appropriate inspection tool (which could be of standard or dedicated type, for example).

What is understood as being an element that is visible to the naked eye is described in the document entitled "How to select a security feature" (issued by "The document security alliance and the North American security products organization") under the heading "Overt" or "first-level".

Thereafter, the electronic identity document 100 transmits (A314) to the first terminal 120 the digital image containing the marker MQ, referred to herein for reasons of clarity as the "modified digital image" IM2.

After receiving B314 this modified digital image IM2, the modified digital image IM2 may be checked by the first terminal 120, e.g. the purpose of checking the identity of the bearer of the electronic passport 100. As explained above, it is generally not possible for the bearer of the electronic identity document 100 to control or to prevent any subsequent use that the user of the first terminal 120 might make of the image. For example, when the modified digital image IM2 is an identity photo, the bearer of the electronic device 100 may legitimately desire that distribution of the modified digital image IM2 should be restricted to a particular use (e.g. an identity check).

The sensitive or confidential nature of the digital image IM2 may in particular make it necessary for any subsequent distribution by the first terminal 120 to the outside to be restricted.

In an example, after receiving B314 the modified digital image IM2, the first terminal 120 displays the modified digital image IM2 (in which the marker MQ is included).

In an example, the fact that the marker MQ is included in the digital image IM1 does not require any particular processing to be performed by the terminal 120 in order to enable it to display the modified digital image IM2.

In an example, the modified digital image IM2 is transmitted in non-encrypted form by the electronic identity document 100 to the terminal 120. Under such circumstances, the terminal 120 can display the modified digital image IM2 without prior processing.

The present invention nevertheless covers variant embodiments in which the first terminal 120 does not display the modified digital image IM2 after the reception step B314.

In a particular embodiment, the modified digital image IM2 is used by the terminal 120 for internal processing purposes. For example, when the digital image IM2 is a biometric image coming from a biometric travel document, the terminal 120 may use it for strong authentication of the bearer of said travel document by performing a biometric comparison with a biometric image taken from the bearer of the document.

Consideration is given below to the situation in which the first terminal 120 transmits (B316) the modified digital image in an unauthorized manner to a third party, e.g. to a second terminal 350. Alternatively, it is possible to envisage that the sending B316 by the first terminal 120 is authorized, but that the second terminal 350 in turn transmits the modified digital image IM2 in unauthorized manner to some other destination.

The presence of the marker MQ in the modified digital image IM2 makes it possible subsequently to determine the original entity from which this non-authorized distribution stems. Advantageously, the invention makes it possible, starting from the marker MQ present in the modified digital image IM2, to identify the first destination that initially received the modified digital image IM2 coming from the electronic identity document 100, namely the first terminal 120 or the operator of the first terminal 120 in the present example. Specifically, as mentioned above, the marker MQ is generated (A310) by the electronic identity document 100 from the attribute AT, which attribute is specific to the first terminal 120, to the operator of the first terminal 120, or to the transaction between the first terminal 120 and the electronic identity document 100 that led to the modified digital image IM2 being transmitted to the first terminal 120. Subsequent recovery of the marker MQ makes it possible to determine the identity of the first terminal 120 and/or the identity of the operator of the first terminal 120.

In the particular situation where the attribute AT is a date (e.g. the date on which the exchange took place between the first terminal 120 and the electronic identity document 100), the date constitutes information that, possibly in association with other information, makes it possible to determine the identity of the first terminal 120.

Once the first terminal 120 (or the operator of the first terminal 120) has been detected as the original destination for the modified digital image IM2 in question, it is possible to proceed with the actions needed in order to determine the reasons for the subsequent distribution (B316) of the modified digital image IM2 to other entities, and where necessary to follow up the distribution chain in order to determine the responsibilities of the actors in question.

With reference to FIG. 5, there follows a description example of an implementation of a method for determining the attribute AT on the basis of the marker MQ incorporated in the modified digital image IM2, i.e. a method that makes it possible to determine the identity of the original destination.

In the present document, it should be observed that elements that axe common to both distinct implementations are given the same reference numbers and they present characteristics that are identical, so they are not described again for reasons of simplicity.

FIG. 3 shows, in diagrammatic manner and in a second implementation, the electronic identity document 100, the first terminal 120, and a trusted third party 200. As mentioned above, the electronic identity document 100 can cooperate with the first terminal 120 via the first communication link 110. Furthermore, the first terminal 120 cooperates with the trusted third party 200 via a second communication link 210. In addition, the electronic identity document 100 cooperates with the trusted third party 200 via a third communication link 220.

Figure 4:
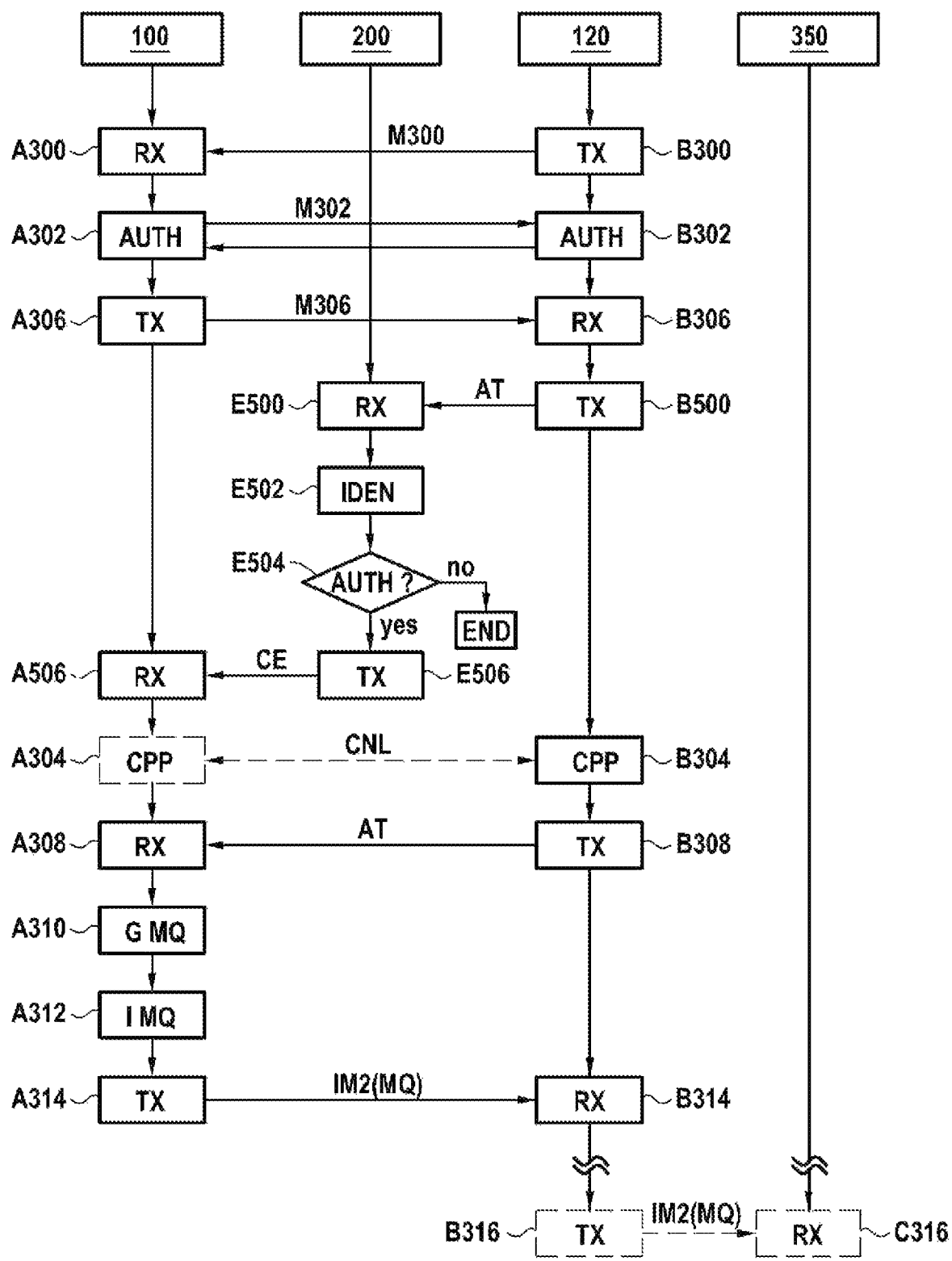
FIG. 4 is a flowchart showing the main steps of a secure transmission method in accordance with the second implementation shown in FIG. 3.

Still in the second implementation, FIG. 4 shows a transmission method performed by the electronic identity document 100 executing the program P1. This second implementation is a variant of the first implementation as described above with reference FIG. 2, and it differs solely in that a trusted third party 200 intervenes to verify the authenticity of the first terminal 120 before the first terminal 120 proceeds to send B308 the attribute AT.

In this method, the first terminal 120 sends a request M300 to read the digital image IM1 stored in the electronic identity document 100 (step B300).

This step B300 is followed by the authentication step A302, B302.

Following the step A302, B302, the electronic identity document 100 sends the first terminal 120 a request M306 to read the attribute AT of said first terminal 120 (step A306).

On receiving such a request, the first terminal 120 sends this attribute AT to the trusted third party 200 in a step B500.

Said trusted third party 200 then identifies and authenticates said first terminal 120, thereby revealing the identity of the first terminal 120 (step E502).

Thereafter, if the attribute AT corresponds to a first terminal 120 that is authorized to receive the digital image IM1 of the electronic identity document 100 (step E504), the trusted third party 200 acts in a step E506 to send an electronic certificate CE to the electronic identity document 100. This electronic certificate CE is a guarantee from the trusted third party 200 showing that the first terminal 120 has been identified by the trusted third party 200 as being an authorized terminal.

In a variant, the trusted third party 200 sends the electronic certificate CE to the terminal 120, which then sends the electronic certificate CE to the identity document 100.

The following steps are performed in identical manner to the corresponding steps of the first implementation shown in FIG. 1.

In particular, the communication channel CNL is then created between the electronic document 100 and the first terminal 120 (step A304, B304).

In a variant, the step A304, B304 of creating the communication channel CNL is not performed, as mentioned above with reference to FIG. 2.

In a variant, the steps A304, B304, A306, and B308 are not performed, and the attribute AT is sent during the authentication step A302, B302, as explained above with reference to FIG. 2.

FIG. 5 shows in diagrammatic manner, the main steps of a method of determining the attribute AT from the marker MQ incorporated in the modified digital image IM2, thus making it possible to determine the identity of the first terminal 120 in a particular implementation. In this example, the method is implemented by a third terminal 400 executing a program P2, said third terminal 400 receiving the modified digital image IM2 from the second terminal 350 or from some other terminal. In an example, said other terminal belongs to an honest person or to a police authority.

It should be observed that the method may be performed by the second terminal 350 itself executing the program P2, said second terminal 350 having received the modified digital image IM2. Under such circumstances, the second and third terminals 350, 400 constitute a single common terminal.

In this example, the third terminal 400 has hardware architecture identical to that of the first terminal 120. More precisely, each of the second terminal 350 and the third terminal 400 comprises a microprocessor, a ROM, a non-volatile rewritable memory (e.g. of the EEPROM type or of the Flash NAND type), a volatile rewritable memory (of the RAM type), and an input and output interface.

In this example it is assumed that the third terminal 400 has previously received the modified digital image IM2 containing the marker MQ.

The method of determining the attribute AT in this particular implementation comprises a step D402 of sending to a first database 410, first data D1 obtained from said modified digital image IM2, and a step D403 of receiving, in response to sending the first data D1, second data D2 from the first database 410.

More precisely, the first data D1 may be the modified digital image IM2, a portion of the modified digital image IM2, or information included in the modified digital image IM2. On the basis of this first data D1, the database 410 finds the second data D2, this second data containing extraction information enabling the marker MQ to be extracted from the modified digital image IM2. By way of example, this extraction information may comprise at least one of the following:

the type of marker MQ, for example a type making it possible to determine whether the marker MQ is a marker MQ that is perceptible or that is not perceptible, as explained above;

the type of algorithm used for generating the marker MQ; and the location of said marker MQ and the protection mode of said marker MQ, i.e. whether the confidentiality of the marker MQ is protected by encryption, or whether the integrity of the marker MQ is protected by the attribute AT being signed.

Thereafter, the third terminal 400 extracts (D404) the marker MQ from the modified digital image IM2 by using the extraction information from the second data D2 (step D404). In an example, extracting the marker MQ includes revealing, and/or decrypting, and/or verifying the integrity, and/or verifying the authenticity of the marker MQ. In an example, extracting the marker MQ includes, displaying the modified digital image IM2 with the marker MQ visible.

In a step D406, the third terminal 400 sends the marker MQ to a second database 420. In response to the marker being sent in this way, an identifier of the first terminal 120 corresponding to the marker MQ is recovered (D408) by the third terminal 400. In an example, the identifier is the attribute AT of the first terminal 120 itself.

When the modified digital image IM2 is transmitted by the first terminal 120 to a second terminal 350 (step B316), the marker MQ included in said modified digital image IM2 serves to determine the identity of the first terminal 120. In the event of this transmission of the modified digital image IM2 to the second terminal 350 not being authorized, the marker MQ thus makes it possible, if necessary, to call into question the responsibility of the first terminal 120.

In a variant, the above-described method of determining the attribute AT may be applied by analogy when the marker MQ contains information about the transaction between the electronic identity document 100 and the first terminal 120, or indeed information about the operator of the first terminal 120.

One example implementation relates to an electronic passport 100 complying both with the specifications of the international civil aviation organization (ICAO) and with European technical requirements for travel documents. The extended access control (EAC) protocol as specified in the "TR 03110 v1.11" directives (as required for European travel documents) then makes it possible to transmit to the electronic passport 100 attributes AT relating to the terminal, such as the identity of said terminal, (known as "CHR"), or to the exchange, such as its date (known, as the "effective date"), with this being certified either by the country verification certificate authority (CVCA) or by the document verifier (DV). Successful mutual authentication in compliance with the EAC protocol (as specified in the "TR 03110 v1.11" directives) authorizes the terminal 120 to access the image of the biometric identifier (fingerprint and/or iris image) contained in the electronic passport 100. Said electronic passport 100 may then return the requested image to the terminal 120, which image includes the marker MQ reproducing the above-mentioned, attribute(s) (AT) (date of the exchange and/or identity of the terminal, for example ).

The invention claimed is:

1. A transmission method for securely transmitting an image stored in a memory of an electronic identity document to a first terminal suitable for receiving said image, said method being performed by said electronic identity document, and comprising:

the electronic identity document receiving an attribute transmitted by the first terminal, wherein the attribute comprises information identifying the first terminal, about an operator of the first terminal, or about a transaction between the first terminal and the identity document that led to the receiving;

generating a marker on the basis of the attribute, such that:
information contained in the marker is the attribute, or
the marker contains a portion of the attribute, or
the marker is generated by performing a calculation on the basis of the attribute;

including said marker in the image, the inclusion modifying the value of at least one pixel of the image; and transmitting the image containing said marker to the first terminal, such that the first terminal, the operator, or the transaction can be identified from any subsequent distribution of the image containing the marker by the first terminal.

2. A transmission method according to claim 1, wherein the attribute comprises authentication data verified by the electronic identity document.

3. A transmission method according to claim 1, wherein said attribute is at least one of the following: a date; a location of said first terminal; an identifier of said first terminal; an identifier of the operator of said first terminal; or any other attribute characterizing an exchange.

4. A transmission method according to claim 1, wherein the including the marker modifies the visual appearance of said image.

5. A transmission method according to claim 1, wherein the including the marker in the image is invisible to the naked eye with respect to a visual appearance of the image.

6. A transmission method according to claim 1, wherein during the generating, the confidentiality of the marker is protected by encryption.

7. A transmission method according to claim 1, wherein during the generating, the integrity and/or the authenticity of the marker is/are protected by the first terminal signing the attribute.

8. A transmission method according to claim 1, wherein the electronic identity document is an electronic passport; and wherein said attribute received by the electronic identity document is transmitted by the first terminal in compliance with the extended access control protocol specified by the TR 03110 v1.11 directives.

9. A non-transitory computer readable medium including instructions that perform the transmission method according to claim 1, when said instructions are executed by the electronic identity document.

10. A non-transitory storage medium readable by the electronic identity document, the medium having recorded thereon a computer program including instructions for executing the transmission method according to claim 1.

11. The transmission method according to claim 1, further comprising:

receiving, by a second terminal, the image containing the marker; and extracting the marker contained in said image.

12. The transmission method according to claim 11, further comprising:

sending, by the second terminal, said marker to a first database; and in response to sending said marker, recovering the attribute from said first database.

13. The transmission method according to claim 11, comprising:

prior to the extracting, sending to a second database first data obtained from said received image and receiving second data in response to sending said first data; and performed the extracting on the basis of said second data.

14. A transmission method according to claim 1, wherein the inclusion modifies the image in irreversible manner.

15. A transmission method according to claim 1, comprising the electronic identity document authenticating the first terminal, and creating a secure communication channel between the electronic identity document and the first terminal if the first terminal is authenticated successfully by the electronic identity document.

16. A transmission method according to claim 1, wherein the marker is included in the image in imperceptible manner by steganographic coding, the maker being hidden in the values of the low-weight bits encoding the pixels of the image, or in the format of the image, using lossy compression.

17. A transmission method according to claim 1, comprising a trusted third party verifying the authenticity of the first terminal before the electronic identity document receiving an attribute transmitted by the first terminal.

18. A transmission method according to claim 13, wherein the second data comprises at least one of the following: the type of marker; the type of algorithm used for generating the marker; the location of the maker and the protection mode of said marker.

19. An electronic identity document for securely transmitting an image stored in a memory of the electronic identity document to a first terminal suitable for receiving said image, the electronic identity document comprising:
  means for receiving an attribute transmitted by the first terminal, wherein the attribute comprises information identifying the first terminal, about an operator of the first terminal, or about a transaction between the first terminal and the identity document that led to the receiving;
  means for generating a marker from the attribute, such that:
    information contained in the marker is the attribute, or
    the marker contains a portion of the attribute, or
    the marker is generated by performing a calculation on the basis of the attribute;
  means for including said marker in the image, the inclusion modifying the value of at least one pixel of the image; and
  means for transmitting the image containing said marker to the first terminal, such that the first terminal, the operator, or the transaction can be identified from any subsequent distribution of the image containing the marker by the first terminal.

20. A second terminal for determining an attribute from a marker incorporated in an image, said second terminal comprising:
  means for receiving the image containing the marker; and
  means for extracting the marker contained in the image;
  wherein the image containing the marker was created by an electronic identity document that performs a method comprising:
    receiving an attribute transmitted by a first terminal, wherein the attribute comprises information identifying the first terminal, about an operator of the first terminal, or about a transaction between the first terminal and the identity document that led to the receiving;
    generating the marker on the basis of the attribute, such that:
      information contained in the marker is the attribute, or
      the marker contains a portion of the attribute, or
      the marker is generated by performing a calculation on the basis of the attribute;
    including said marker in the image, the inclusion modifying the value of at least one pixel of the image; and
    transmitting the image containing said marker such that the first terminal, the operator, or the transaction can be identified from any subsequent distribution of the image containing the marker by the first terminal.

21. The second terminal according to claim 20, further comprising:
  means for sending the marker to a first database; and
  means for recovering, in response to sending said marker, the attribute from said first database.

22. The second terminal according to claim 20, further comprising:
  means for sending to a second database first data obtained from said received image and
  means for receiving second data in response to sending said first data;
  wherein said means for extracting performs the extracting on the basis of said second data.

23. A system comprising
  an electronic identity document for securely transmitting an image stored in a memory of the electronic identity document to a first terminal suitable for receiving said image, the electronic identity document comprising:
    means for receiving an attribute transmitted by the first terminal, wherein the attribute comprises information identifying the first terminal, about an operator of the first terminal, or about a transaction between the first terminal and the identity document that led to the receiving;
    means for generating a marker from the attribute, such that:
      information contained in the marker is the attribute, or
      the marker contains a portion of the attribute, or
      the marker is generated by performing a calculation on the basis of the attribute;
    means for including said marker in the image, the inclusion modifying the value of at least one pixel of the image; and
    means for transmitting the image containing said marker to the first terminal, such that the first terminal, the operator, or the transaction can be identified from any subsequent distribution of the image containing the marker by the first terminal; and
  a second terminal for determining the attribute from the marker contained in the image, said second terminal comprising:
    means for receiving the image containing the marker; and
    means for extracting the marker contained in the image;
    wherein the image containing the marker was created by the electronic identity document.

* * * * *